United States Patent [19]

Suzuki et al.

[11] Patent Number: 5,267,171

[45] Date of Patent: Nov. 30, 1993

[54] COMPUTER SOFTWARE VENDING MACHINE

[75] Inventors: Takamitsu Suzuki, Nagoya; Yasuyo Mori, Yokkaichi, both of Japan

[73] Assignee: Brother Kogyo Kabushiki Kaisha, Nagoya, Japan

[21] Appl. No.: 671,473

[22] Filed: Mar. 19, 1991

[30] Foreign Application Priority Data

Mar. 29, 1990 [JP] Japan ................. 2-35177[U]
Mar. 29, 1990 [JP] Japan ................. 2-35178[U]

[51] Int. Cl.⁵ ............................................ G06F 15/21
[52] U.S. Cl. ................................... 364/479; 364/401
[58] Field of Search ............ 364/479, 401, 403, 410, 364/518, 155; 235/375, 380, 381

[56] References Cited

U.S. PATENT DOCUMENTS

| | | | |
|---|---|---|---|
| 4,654,799 | 3/1987 | Ogaki et al. | 364/479 |
| 4,677,565 | 6/1987 | Ogaki et al. | 364/479 |
| 4,775,935 | 10/1988 | Yourick | 364/401 |
| 4,787,050 | 11/1988 | Suzuki | 364/479 |
| 4,884,212 | 11/1989 | Stutsman | 364/479 |
| 4,896,791 | 1/1990 | Smith | 221/7 |
| 4,949,257 | 8/1990 | Orbach | 364/401 |
| 5,088,586 | 2/1992 | Isobe et al. | 194/205 |
| 5,166,886 | 11/1992 | Molnar et al. | 364/479 |

Primary Examiner—Jerry Smith
Assistant Examiner—Paul Gordon
Attorney, Agent, or Firm—Oliff & Berridge

[57] ABSTRACT

A computer software vending machine includes an information storage unit for storing user information relating to a particular user when the user utilizes the computer software vending machine. An information reading unit reads various information from the information storage unit. The storing unit stores a plurality of computer software and user information relating to the user when the user utilizes the computer software vending machine. A comparing unit compares the user information stored in the storing unit with the user information relating to the user when the user utilizes the computer software vending machine. A selecting unit selects computer software which has been supplied from the computer software vending machine after the user last utilized the computer software vending machine from the information storage unit, on the basis of the comparison with the comparing unit. The displaying unit displays the computer software selected by the selecting unit.

9 Claims, 8 Drawing Sheets

| identity code K | category code J | Model designating code M | registration code D |
|---|---|---|---|
| 1 | A | ZZ | 89, 1,10 |
| 2 | B | XX, ZZ | 89, 7, 1 |
| 3 | A | YY | 88,12, 1 |
| 4 | C | XX, ZZ | 90, 6, 1 |
| 5 | A | YY, ZZ | 89,11, 1 |
| 6 | B | XX | 90, 6, 1 |
| 7 | C | YY | 90, 4, 1 |
| . | . | .. | .. . . |
| . | . | .. | .. . . |
| . | . | .. | .. . . |
| N | A | XX | 89,11, 1 |

Fig.5(b)

```
NAME:      TOM         ──,──── ID
MODEL:             XX   ─────── IM
UTILIZED HISTORY:
DATE:
  88,01,20  88,05,29   89,03,14
  89,09,28  90,04,25   90,05,28
                              \
                               LU

PURCHASED HISTORY:
DATE:          CATEGORY:
  88,05,29 ;     A      ;
  90,04,25 ;     C      ;
           \           \
            LV          IJ
```

COMPUTER SOFTWARE VENDING MACHINE

BACKGROUND OF THE INVENTION

1. Field of the Invention

The present invention relates to a vending machine for computer software, and more particularly to a computer software vending machine which provides a computer software display in accordance with the user's known preferences and the user's use history.

2. Discussion of the Related Art

Computer software vending machines and a managing apparatus for managing the computer software vending machines of these types are known, for example as in U.S. Pat. Nos. 4,787,050, and 4,677,565.

In these types of computer software vending machines, each user who wants to purchase computer software is required to select computer software which suits the user's liking from among a large number of candidates of computer software.

A great deal of time is, however, required before the user selects and buys computer software meeting his liking, since such vending machines necessarily have a plurality of computer software from which to choose to satisfy the requirements of a variety of users with differing use histories.

For this reason, the users are often dissatisfied with such conventional vending machines.

OBJECTS AND SUMMARY OF THE INVENTION

It is, therefore, an object of the present invention to overcome the above-described drawbacks and disadvantages by providing a computer software vending machine which provides computer software according to a user's known preferences and a user's use history.

Another object of the present invention is to provide a computer software vending machine which permits shortening of the time required for each user to select and buy computer software.

A further object of the present invention is to provide a computer software vending machine capable of tailoring newly-received software in accordance with each user.

According to the present invention, there is provided a computer software vending machine which comprises: information inputting means for inputting user information relating to the user; storing means for storing a plurality of computer software and user information relating to the user, the computer software being related to the user information; comparing means for comparing the user information stored in the storing means with the user information input by the information inputting means; selecting means for selecting computer software on the basis of the comparison with the comparing means; and display means for displaying the selected computer software selected by the selecting means.

According to the present invention, the information inputting means inputs user information relating to the user. The comparing means compares the user's information stored in the storing means with the user information relating to the user input by the information inputting means. The selecting means selects computer software on the basis of the comparison with the comparing means. Next, the display means displays the computer software selected by the selecting means.

BRIEF DESCRIPTION OF THE DRAWINGS

The foregoing and other objects, features and advantages of the present invention will become more apparent by reading the following detailed description of presently preferred embodiments of the present invention, when considered in conjunction with the accompanying drawings, in which:

FIG. 5(*a*) is a diagram showing an exemplary table for the management of computer software stored in the computer software vending machine;

FIG. 5(*b*) is a schematic diagram showing a card and the data stored therein;

DETAILED DESCRIPTION OF THE PREFERRED EMBODIMENTS

Referring now to the drawings and particularly to FIGS. 1-6 thereof, one preferred embodiment of the present invention will be described.

Figure 1:
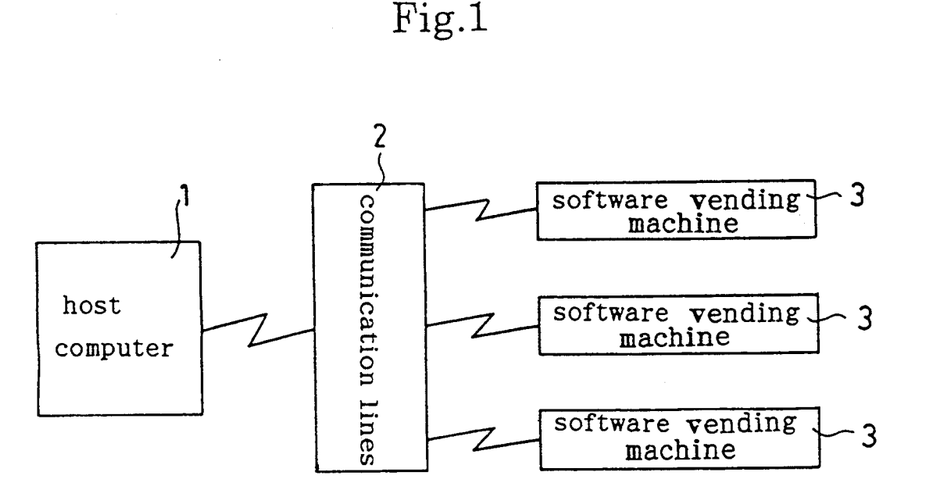
FIG. 1 is a block diagram showing the construction of a computer software vending system according to an embodiment of the present invention.

As shown in FIG. 1, computer software vending machines 3 mounted in retail stores throughout the country are connected to a host computer 1 through communication lines 2, so that the host computer 1 can supply computer software (hereinafter referred to as "software") to the software vending machines through the communication lines 2.

Figure 2:
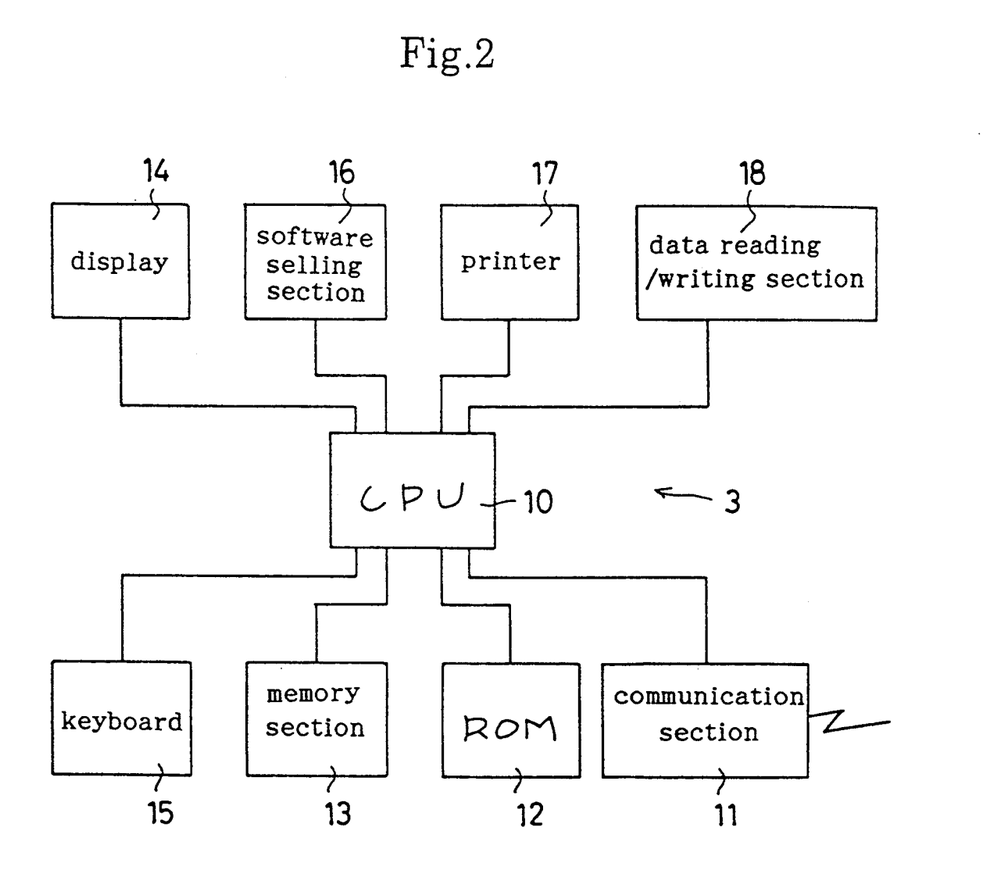
FIG. 2 is a block diagram of a computer software vending machine.

As shown in FIG. 2, the interior of each software vending machine 3 is provided with a CPU (central processing unit) 10. The CPU 10 is connected to a communication section 11 which is in turn connected to the host computer 1 through a communication line 2 and a ROM (read-only memory) 12 which stores a control program for controlling the CPU 10. The software vending machine 3 includes a memory section 13 which stores not only various software programs and manual data but also stores display programs for instructions on using the software vending machine 3 and display programs for operating procedures. The memory section 13 also stores programs for demonstration of each software. The software vending machine 3 also includes a display 14 for displaying various software demonstrations, instructions for using the software vending machine 3, and procedures for operating the software vending machine 3. The software vending machine 3 also includes a keyboard 15 to be used by each user to select a software or to input information indicating whether the user wants to select and buy the software, a software selling section 16 for selling computer software, and a printer 17 for printing a software manual as shown in U.S. Pat. No. 4,677,565.

Figure 5A:
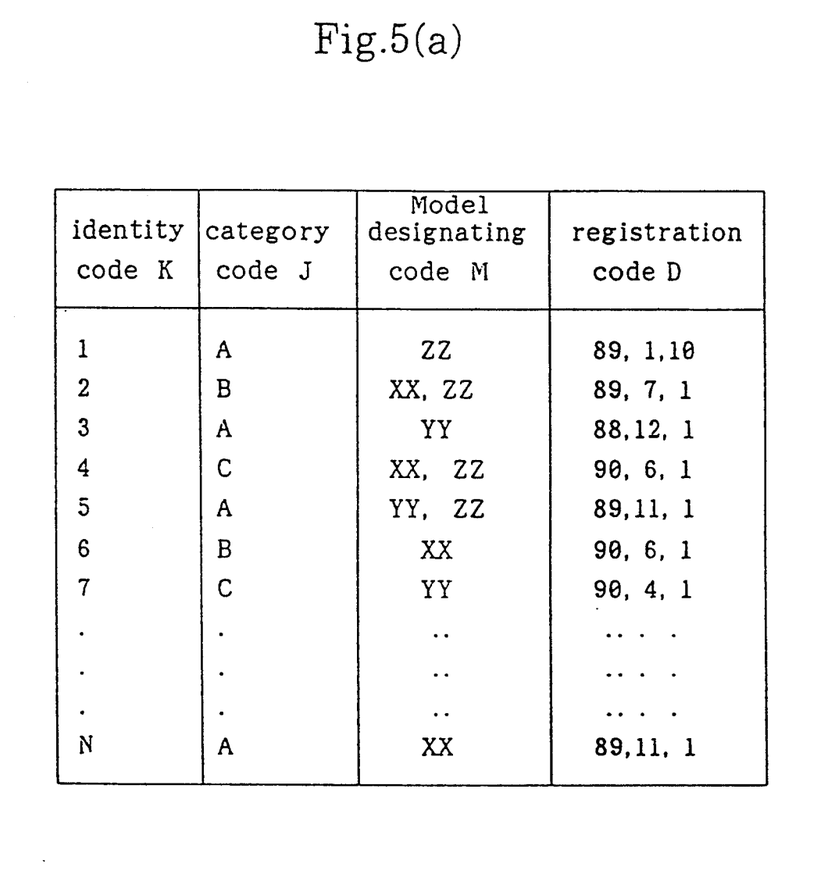

As shown in FIG. 5(a), the memory section 13 stores identity code K which identifies a software program, category code J which indicates a category of software programs, model designating code M which indicates the designated models of microcomputers which can be executed by the software programs, registration code D which indicates the registration day, i.e., the day when software programs are supplied from the host computer 1 through the communication line 2, as well as software programs.

The software vending machine 3 is further provided with a data reading/writing section 18 which not only performs the insertion and discharge of an ID (identification) card 20 which serves as an information storage means storing data indicative of the date when the user having the ID card 20 last utilized the software vending machine 3, but also reads various data from the ID card 20 and writes data thereon.

Figure 5B:
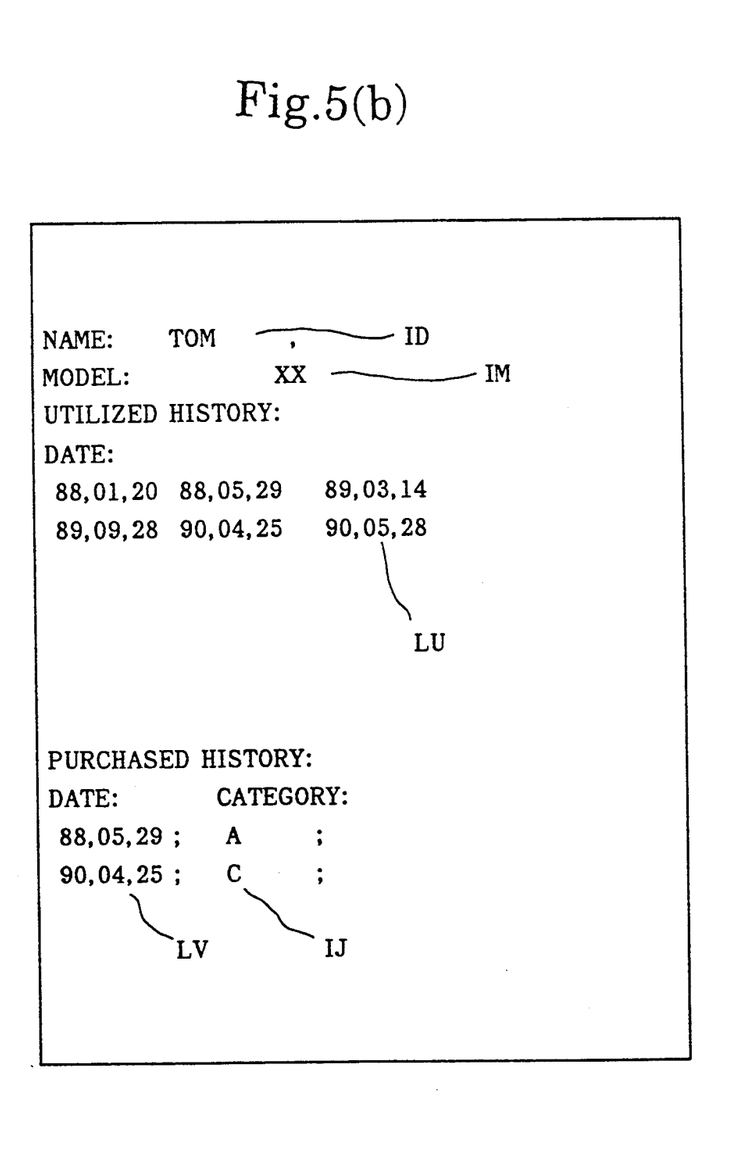

The card 20 stores information LU relating to the latest utilization date when the user utilized the software vending machine 3, information LV relating to the day when the user purchased software programs from the software vending machine 3, identity information ID identifying the user, category information IJ indicating the category of software programs purchased by the user from the vending machine 3, and information IM indicating the designated models of microcomputers which can execute the software programs as shown in FIG. 5(b). The card 20 includes magnetic storage tape (not shown) embedded in the body such as that usually used in a cash card or the like.

Figure 4:
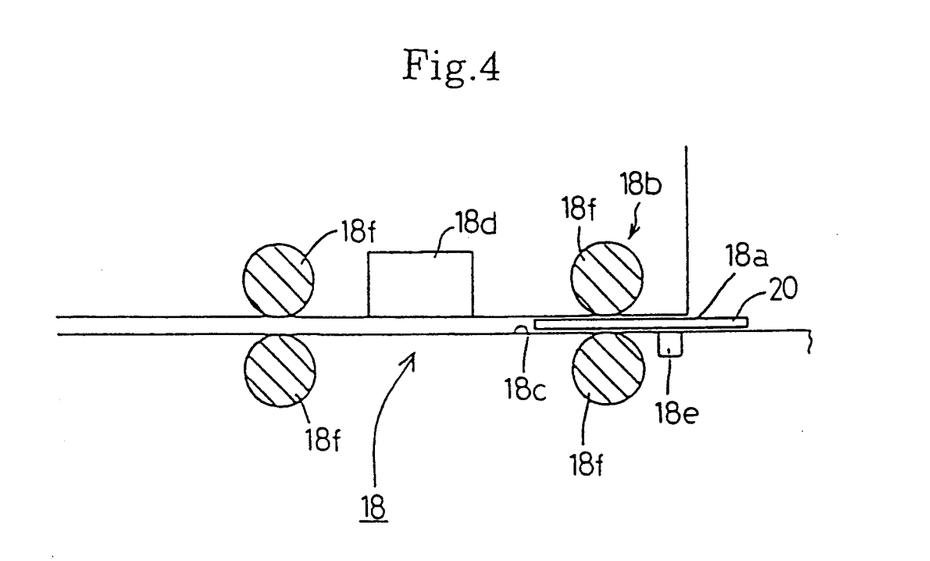
FIG. 4 is a sectional view of a reader section for reading users' cards in the computer software vending machine.

As shown in FIG. 4, the information reading/writing device 18 has a card inlet/outlet port 18a, a card feeder 18b coupled with the inlet/outlet port 18a for feeding the ID card 20 into the inside of the vending machine 3, a card path 18c provided with the card feeder 18b through which the card 20 passes, an information reading/writing portion 18d installed at the card path 18c for reading or writing the information in the magnetic storage tape of the card 20. The card feeder 18b comprises a sensor 18e installed in the vicinity of the card inlet/outlet port 18a along the card path 18c for detecting the presence of the card 20 and a plurality of rollers 18f arranged along the card path 18c for feeding the card 20 based on the detection of the sensor 18e. When the ID card 20 is inserted into the inlet/outlet port 18a by a user, the sensor 18e detects the presence of the card 20.

The rollers 18f are thereafter rotated, and the card 20 is conveyed along the card path 18c to the inside of the apparatus. The information reading/writing portion 18d reads information in the magnetic storage tape of the card 20, transmits it to the CPU 10 and also writes information from the CPU 10. The data reading/writing section 18 serves as both an information reading means and an information writing/rewriting means. The CPU 10 and the ROM 12 constitute a comparing means and selecting means.

New software fed from the host computer 1 through the communication line 2 is received by the communication section 11, and the CPU 10 writes a program of this software, together with its received date, from the communication section 11 into an empty capacity portion in the memory section 13. In the event there is no empty capacity in the memory section 13, the CPU 10 superscribes a program of the newly-received software in an unpopular software storing portion together with its received date, as shown in U.S. Pat. No. 4,787,050.

The operation of the software vending machine 3 of this embodiment will now be described below with reference to FIGS. 1 to 6.

Figure 3:
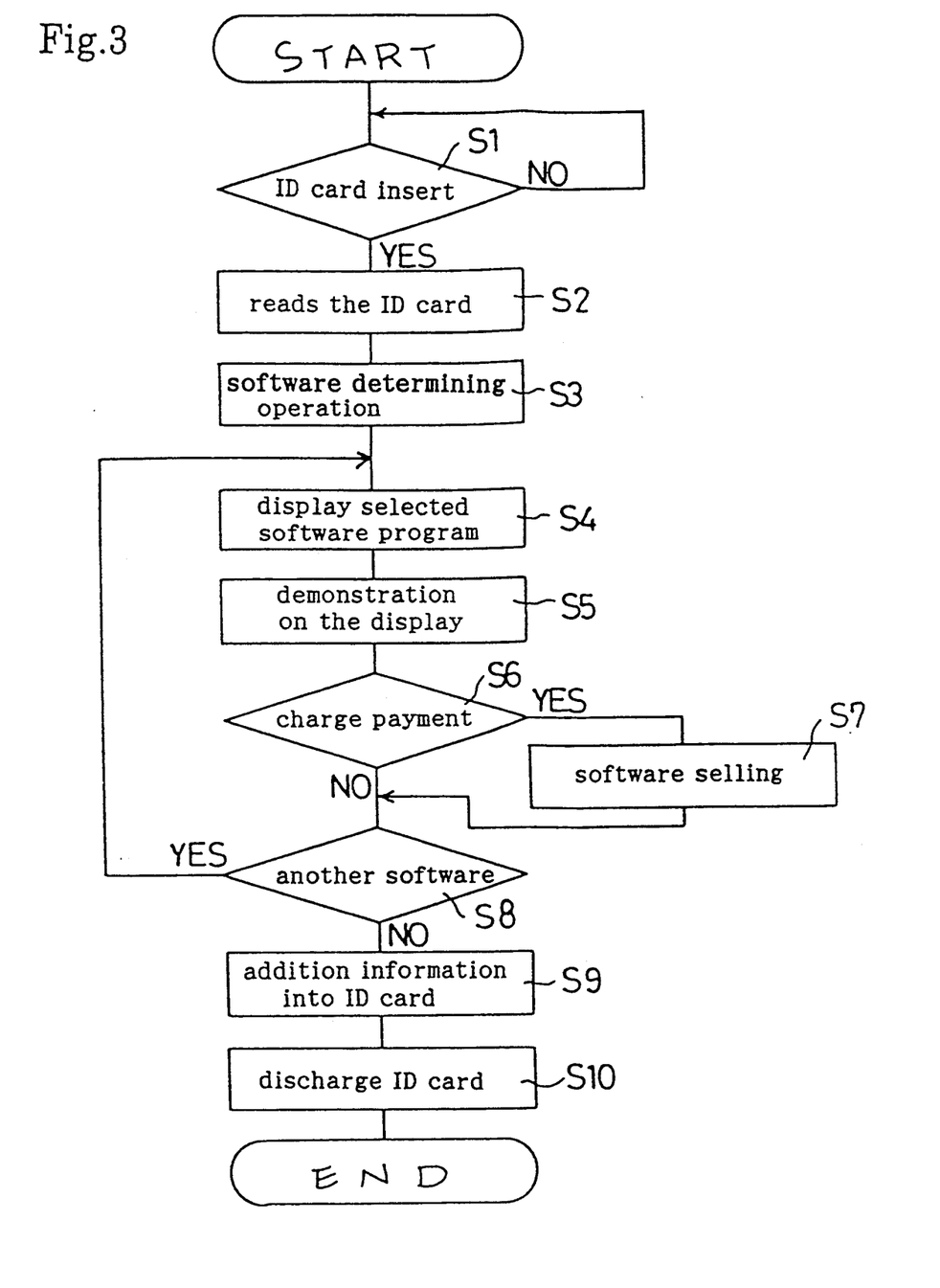
FIG. 3 is a main flowchart showing the operation of the computer software vending machine.

Initially, as shown in FIG. 3, when the user is to operate the software vending machine 3, the CPU 10 instructs the user to insert his ID card 20 into a card inlet/outlet port 18a of the data reading/writing section 18.

This instruction is given in the form of a display on the display 14. This instruction state is repeated until the ID card is inserted into the card inlet/outlet port 18a (step 1, hereinafter indicated simply by S1, and following steps are indicated in a like manner). The user inserts his ID card 20 into the card inlet/outlet port 18a of the data reading/writing section 18. After the CPU 10 checks whether the ID card 20 has been inserted into the card inlet/outlet port 18a or not, and if the answer is affirmative, the CPU 10 causes the data reading/writing section 18 to read from the ID card 20 the information LU of the latest utilization date when the user utilized the software vending machine 3 with the ID card 20 (S2)

From the information LU of the latest utilization date by the user read by the data reading/writing section 18, the CPU 10 determines which software has not yet been reviewed by the user, and retrieves the software from the memory section 13 on the basis of this determination (S3).

Figure 6:
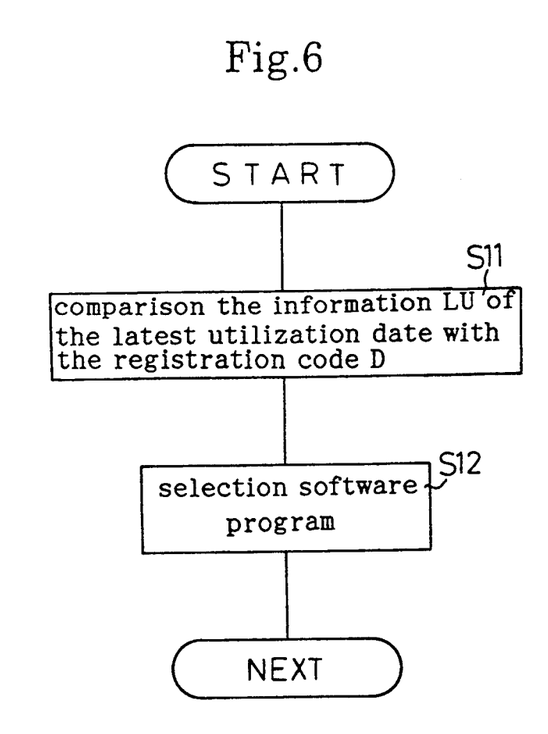
FIG. 6 is a flow chart illustrating a managing procedure of software programs stored in memory in the vending machine according to the present invention.

Now, the determination operation in S3 executed by the CPU 10 will be described below with reference to FIG. 6.

The CPU 10 compares the information LU of the latest utilization date when the user utilized the software vending machine 3 with the registration code D, as shown in FIG. 5, which indicates the registration day when software programs are supplied from the host computer 1 (S11). The CPU 10 selects software programs which have been supplied from the host computer 1 after the user last utilized the vending machine 3 (S12).

The CPU 10 reads the identity codes K for identifying software programs from the memory section 13. The software thus read by the CPU 10 from the memory section 13 is displayed on the display 14 (S4).

The user selects software suiting his or her liking from among the software displayed on the display 14 and inputs the selected software using the keyboard 15, causing the CPU 10 to read programs for the demonstration of that software from the memory section 13 and display it on the display 14 (S5). When the user wants to purchase this software, the user provides input indicative thereof using the keyboard 15 and pays for the software using a charge payment port (not shown) of the software vending machine 3 (S6: Yes).

The CPU 10 causes the software selling section 16 to write a program of the software purchased by the user onto a floppy disc provided in the software vending machine 3. Thereafter, the floppy disc is discharged to the exterior of the software vending machine 3 from a discharge port (not shown) of the software selling section 16. The CPU 10 causes the printer 17 to print a manual of the software and discharge the manual from a discharge port (not shown) of the printer 17 (S7).

In the case where the user does not want to purchase the software displayed on the display 14, the user provides input indicative thereof using the keyboard 15 (S6: No). After the software vending machine 3 completes the sale of the software, or when the user does not purchase the software displayed on the display 14, the CPU 10 inquires through the display 14, whether the user desires to select other software. When the user answers affirmatively using the keyboard 15 (S8: Yes), execution returns to S4 described above and the user is again able to select software from a plurality of software read from the memory section 13 by the CPU 10 and displayed on the display 14.

When the user answers negatively using the keyboard 15 (S8: No), the CPU 10 adds the information LU of this utilization date of the user to the inserted ID card 20 using the data reading/writing section 18 (S9). After the CPU 10 causes the data reading/writing section 18 to write the information LU of this utilization date of the user, the CPU 10 causes the rollers 18f to discharge the ID card 20 from input/output port 18a (S10).

According to the present embodiment as set forth above, since computer software which has not yet been reviewed by each user is displayed on the basis of the information of the latest utilization date of the user, it is possible to provide a computer software vending machine capable of tailoring newly-received computer software for each user. This provides an outstanding advantage from the commercial standpoint.

Although in this embodiment the information of the latest utilization date of each user is stored in the ID card 20, there may be adopted a construction in which only the data for the identification of each user is stored in the ID card 20, and when the ID card 20 is inserted into the software vending machine 3, the CPU 10 reads the information LU of the latest utilization date of the user from an information storing memory which is provided within the software vending machine 3 and which stores the latest utilization dates of the users of the software vending machine 3. On the basis of the information thus read, the CPU 10 can select from the memory section 13 software which has not yet been reviewed by the user.

A second embodiment will now be described hereinafter.

In this embodiment, like parts and components are utilized as those used in FIGS. 1–5(b). Only the determination operation executed by the CPU 10, as shown in FIG. 3, is different from the determination operation described in conjunction with the first embodiment.

Accordingly, only the determination operation executed by the CPU 10 will be described below with reference to FIG. 7.

Figure 7:
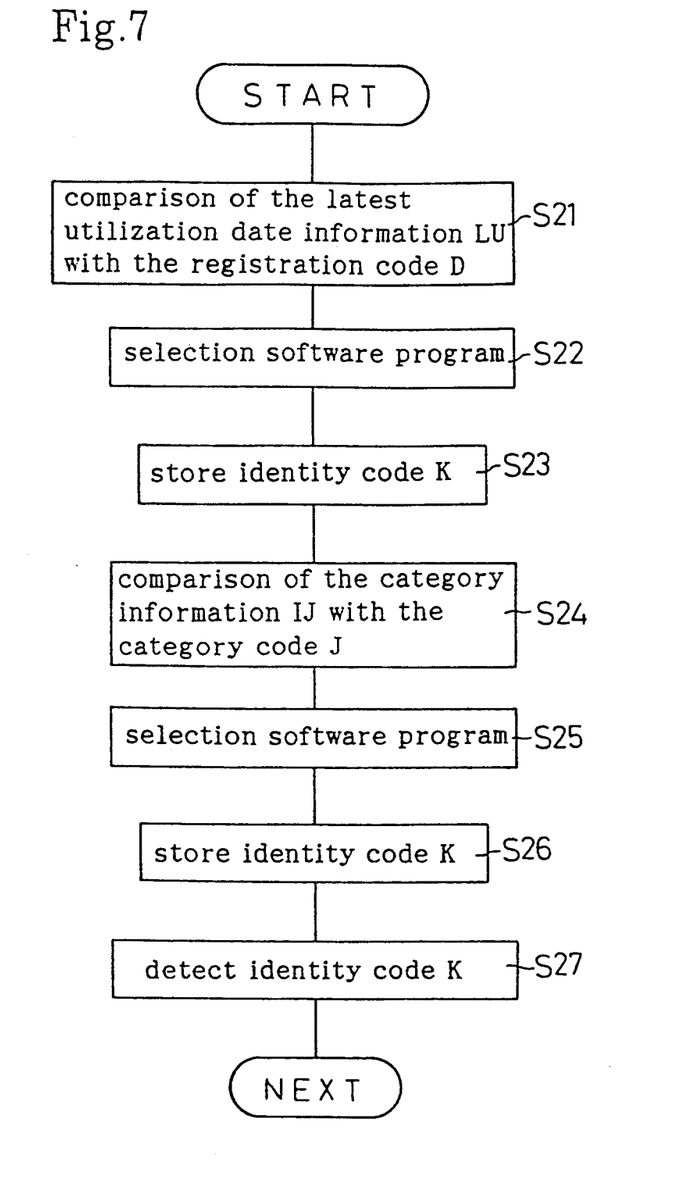
FIG. 7 is a flow chart illustrating a managing procedure of software programs stored in memory in the vending machine according to a second embodiment of the present invention.

The CPU 10 compares the latest utilization information LU when the user last utilized the software vending machine 3 with the registration code D, as shown in FIG. 7 which indicates the registration day when software programs are supplied from the host computer 1 (S21). The CPU 10 selects only computer software programs which have been supplied from the host computer 1 after the user last utilized the vending machine 3 (S22).

The CPU 10 stores the identity codes K corresponding to the software programs selected in S22 in the memory section 13 (S23).

The CPU 10 compares the category information IJ indicating the category of the software programs last purchased by the user with the category code J as shown in FIG. 5(a) (S24). The CPU 10 selects software programs which yield the category obtained from the S24 comparison (S25). The CPU 10 stores the identity codes K corresponding to the software programs selected in S25 in the memory section 13 (S26). The CPU 10 reads the identity codes K which are stored in the memory section 13 in S23 and S26 and detects the identity codes K which are commonly selected in S23 and S26 (S27).

As shown in FIG. 5(a), the memory 13 stores identity code K, category code J, and registration code D. The card 20 stores, as shown in FIG. 5(b), the latest utilization date information LU and the category information IJ. The CPU 10 compares the latest utilization date information LU with the registration code D (S21) and selects software programs which are supplied from the host computer 1 after the user last utilized the vending machine 3 (S22). For example, the latest utilization date LU read from card 20 is 90, 05, 28, and identity codes 4 and 6 of software programs were supplied from the host computer 1 on 90, 6, 1 (after the latest utilization date LU of 90, 05, 28) as shown in FIG. 5(a). Accordingly, the CPU 10 selects identity codes 4 and 6 and stores the identity codes 4 and 6 into the memory section 13 (S23).

The CPU 10 then compares the category information IJ with the category code J (S24) and selects software programs which agree in category (S25). The category information IJ read from card 20 yields category C. As shown in FIG. 5(a), codes 4 and 7 of software programs correspond to category C. Accordingly, the CPU 10 selects identity codes 4 and 7 and stores the identity codes 4 and 7 into the memory section 13 (S26). The CPU 10 finally selects the identity code 4 stored in the memory section 13 which was commonly selected in both Steps S23 and S26.

According to the second embodiment as set forth above, since computer software which has not yet been reviewed by each user is displayed by the software vending machine 3 on the basis of the information of the latest utilization date of the user and the category information IJ indicating the category of the software programs purchased by the user, it is possible to provide a computer software vending machine which permits shortening of the time required for each user to select and purchase computer software and which is capable of tailoring newly-received computer software for each user.

Although in this embodiment the information related to software bought previously by each user is stored in the user's ID card 20, there may be adopted a construction wherein only the data for the identification of each user is stored in the user's ID card 20, and upon insertion of the ID card into the software vending machine 3, the CPU 10 reads the information related to software which the user has bought previously, from an information storage means which is provided within the software vending machine 3 and which stores the information related to the software bought previously by the users of the software vending machine 3. Then, on the basis of the information thus read, the CPU 10 can select from the memory section 13 software which best suits the user's liking based on his previous purchases. As another embodiment, the information storage means may be provided within the host computer.

Further embodiments of the above-described system can be provided. For example, when the user wants to also see software which was available prior to his latest utilization date, the software retrieval range may be widened in reply to an input indicative thereof from the keyboard 15.

In another example, the type of a computer which the user possesses may be stored in his or her ID card, and software not employable in that type of computer may be inhibited from display.

Software can be classified into software used for business, software used for education and software used for recreation. As to the kinds of software used for recreation, such kinds include action, characters, role playing, and simulation. Each software classification involves a more minute classification thereof.

When the user inserts his or her ID card 20 into the card inlet of the data reading/writing section 18, the CPU 10 could check whether the ID card 20 has been inserted into the card inlet, and if the answer is affirmative, the CPU 10 could cause the data reading/writing section 18 to read from the ID card such information as the titles and kinds of the software which the user has bought previously.

Furthermore, there could be adopted a construction wherein the model designating code IM of each user's model is stored in the user's ID card 20, and upon insertion of the ID card 20 into the software vending machine 3, the CPU 10 reads the model designating code IM from the user's ID card 20. Then, on the basis of the information thus read, the CPU 10 selects from the memory section 13 software which best suits the user's model based on the model designating code.

Furthermore, as shown in FIG. 5(a), the memory 13 may store identity code K, category code J, model designating code M and registration code D. The card 20 stores, as shown in FIG. 5(b), the latest utilization date information LU, the model designating code IM and the category information IJ. The CPU 10 compares the latest utilization date information LU with the registration code D and selects software programs which are supplied from the host computer 1 after the user last utilized the vending machine 3. The CPU 10 compares the category information IJ with the category code J and selects software programs which agree in category. The CPU 10 compares the model designating code IM with the model designating code M and selects software programs which agree in model. The CPU 10 selects computer software which is commonly obtained in the above three comparisons.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A vending machine comprising:
   information supplying means for supplying utilization information relating to a particular user's last use of the vending machine to the vending machine;
   storing means for storing an inventory of programs and for storing supply information relating to dates when the programs were added to the vending machine;
   comparing means for comparing the utilization information with the supply information stored in said storing means;
   selecting means for selecting from said storing means programs which have been added to the inventory after the user last utilized the vending machine on the basis of the comparison of said comparing means; and
   displaying means for displaying the programs selected by said selecting means.

2. A vending machine as defined in claim 1, wherein:
   said information supplying means supplies the vending machine with designated model information indicating a model of the user's computer having an ability to execute programs;
   said storing means stores information regarding models of computers having an ability to execute programs stored in said storing means;
   said comparing means compares said utilization information supplied from said information supplying means with the supply information stored in said storing means and compares said designated model information supplied from said information supplying means with said model information stored in said storing means; and
   said selecting means selects programs which were commonly obtained in both comparisons made by said comparing means.

3. A vending machine as defined in claim 1, wherein the information supplying means comprises information storage means for storing utilization information relating to a particular user's last use of the vending machine and information reading means for reading the utilization information from the information storage means.

4. The vending machine as defined in claim 3, wherein said information storage means is a card having storage to which said utilization information is written.

5. The vending machine as defined in claim 3, wherein said information storage means is a card having storage to which said utilization information is written, said utilization information being rewritten when the user uses the machine.

6. The vending machine as defined in claim 5, further comprising:
   information rewriting means for rewriting the utilization information.

7. A vending machine as defined in claim 1, wherein:
   said information supplying means supplies category information relating to categories of programs previously purchased by the user;
   said storing means stores information regarding categories of programs stored in said storing means;
   said comparing means compares said utilization information stored in said information storage means with the supply information stored in said storing means and compares said category information stored in said information storage means with the category information stored in said storing means; and
   said selecting means selects programs which were commonly obtained in both comparisons made by said comparing means.

8. A vending machine comprising:
   information storage means for storing category information relating to categories of programs previously purchased by a particular user with the vending machine;
   means for updating said category information, said category information being updated whenever the user uses said vending machine;
   information reading means for reading the information from the information storage means;
   storing means for storing programs and for storing descriptive information relating to the stored programs;

comparing means for comparing the descriptive information stored in said storing means with the updated category information stored in the information storage means;

selecting means for selecting from said storing means programs on the basis of the comparison made by said comparing means; and displaying means for displaying the programs selected by said selecting means.

9. The vending machine as defined in claim 8, wherein said information storage means is a card, said information storage means further storing information indicating a date the user last utilized the vending machine.

* * * * *